United States Patent [19]
Smith

[11] 4,049,414
[45] Sept. 20, 1977

[54] METHOD AND APPARATUS FOR SPLICING OPTICAL FIBERS

[75] Inventor: Roy E. Smith, Horseheads, N.Y.

[73] Assignee: Corning Glass Works, Corning, N.Y.

[21] Appl. No.: 599,853

[22] Filed: July 28, 1975

[51] Int. Cl.$^2$ .................. C03B 37/00; C03C 27/00
[52] U.S. Cl. ................... 65/4 B; 65/11 R; 65/40; 65/42; 65/152; 65/DIG. 7; 219/57; 219/58; 350/96 WG
[58] Field of Search ............ 65/4 B, 40, 42, 152, 65/DIG. 7, 11 R; 219/56, 57, 58, 123; 350/96 WG

[56] References Cited

U.S. PATENT DOCUMENTS

| | | | |
|---|---|---|---|
| 2,756,308 | 7/1956 | Powell | 219/57 |
| 2,902,573 | 9/1959 | Guyer | 219/123 X |
| 3,384,731 | 5/1968 | Draving | 219/57 |
| 3,394,241 | 7/1968 | Sparrow et al. | 219/57 X |
| 3,893,837 | 7/1975 | Gasbarro | 65/40 X |

OTHER PUBLICATIONS

American Telephone and Telegraph Co. The Bell System Technical Journal, vol. 50, No. 10, Dec. 1971, pp. 5153-5158 (65-40).

*Primary Examiner*—Robert L. Lindsay, Jr.
*Attorney, Agent, or Firm*—William J. Simmons, Jr.; Walter S. Zebrowski; Clarence R. Patty, Jr.

[57] ABSTRACT

A method and apparatus are described for permanently splicing glass optical fibers. The fibers are aligned colinearly, and their endfaces are brought into contact. An electrical arc discharge is generated at the junction between the fibers and is moved along the junction to ensure complete fusing of the fiber endfaces. Best results are obtained by first applying only enough heat to the fiber junction to cause the fibers to adhere to each other without forming a good optical connection, and thereafter, increasing the arc current to a value sufficient to cause complete fusion of the fiber endfaces.

12 Claims, 3 Drawing Figures

METHOD AND APPARATUS FOR SPLICING OPTICAL FIBERS

CROSS-REFERENCE TO RELATED APPLICATION

This application is related to application Ser. No. 599,854 entitled "Method and Apparatus for Splicing Optical Fibers" filed by Y. Kohanzadeh et al. on even date herewith.

BACKGROUND OF THE INVENTION

1. Field of the Invention

This invention relates to a method and apparatus for splicing light transmitting fibers such as, for example, optical waveguides.

High capacity communication systems operating around $10^{15}$ Hz are needed to accommodate future increases in communication traffic. Optical waveguides, which are the most promising medium for transmission at such frequencies, normally consist of an optical fiber having a transparent core surrounded by transparent cladding material. Very low loss glass optical fibers have been produced in accordance with the methods disclosed in U.S. Pat. Nos. 3,775,075 and 3,711,262 issued to D. B. Keck et al. Because of the low losses of such fibers, light can be propagated therethrough many kilometers without the need for repeaters. When the length between repeaters exceeds the length which can be drawn, a plurality of fibers must be connected to provide the desired length. Also, a low loss method is needed for connecting broken fibers. A permanent splice, wherein the fiber endfaces are fused together, is more desirable than a simple connector in these instances. A splice avoids the inherent Fresnel loss experienced in connectors and does not require bulky fiber supporting structure associated with connectors wherein the endfaces of two adjacent fibers are merely secured together in light transmitting alignment.

2. Description of the Prior Art.

Permanent optical fiber connections have been made by applying a transparent bonding material to the fiber ends while they are held in axial alignment. A chemically set glue typically requires several hours to cure. A thermoplastic bonding material has also been employed. Fibers are aligned colinearly and a quantity of low melting point transparent thermoplastic is inserted at the junction thereof. Heat is applied to melt the thermoplastic causing it to flow around the fiber ends. A sleeve has been employed with both chemically cured and thermoplastic bonding materials, the bonding material being introduced through a hole in the sleeve after the fibers have been inserted. Even though attempts are made to match the refractive index of the bonding material to that of the fiber core material, the slight discrepancy which invariably occurs introduces losses due to reflection. Moreover, the sleeve which adds strength to the fiber junction and assists in the axial alignment of the fibers causes the splice to be undesirably bulky. When using such sleeves, the tolerance between the fiber and the inner surface of the sleeve must be very close, i.e. about $1\mu m$, to keep the fibers properly aligned, and such a tolerance is difficult to obtain. Furthermore, bubbles can form at the fiber junction inside sleeve joints, thereby rendering them useless. When epoxy is employed alone at the fiber joint, the resultant joint is too weak to keep the fiber ends aligned when transverse pressure is applied.

Fibers consisting of low-melting point material have been thermally fused, end to end, to provide a good mechanical joint having low transmission loss. In accordance with this technique, the fiber ends are aligned, leaving a space therebetween for thermal expansion. Current is passed through a resistance wire surrounding the fiber ends causing the wire to heat up and fuse the ends together. When the fiber is heated, the longitudinal expansion thereof closes the gap left between the fiber ends. Because of the length of fiber which is heated by the loop of resistance heating wire, the effect of gravity causes poor alignment of the cores of the fibers unless they are vertically disposed during the splicing process. Good mechanical joints can be made having transmission losses as low as about 0.5 dB on fibers of glass having a softening temperature of about 700° C. However, fibers of high silica content glass, such as those described in the aforementioned Keck et al. patents, cannot be joined by this technique, since temperatures up to about 1,600° C. are required. Moreover, when the hot wire butt-fusion method is employed to splice single mode waveguides, losses are much greater than for splicing multimode waveguides, maximum coupling efficiencies of only 70% being reported and reproducibility being poor.

SUMMARY OF THE INVENTION

Accordingly, it is an object of the present invention to provide a method of splicing optical fibers of glass having a high softening temperature.

Still another object of the present invention is to provide a simple and rapid technique for providing a mechanically strong, low loss splice between optical fibers.

Still another object of the present invention is to provide a method of forming optical fiber splices that are substantially free from Fresnel reflections.

The foregoing and other objects of the invention are realized in an illustrative embodiment wherein first and second fibers to be spliced are axially aligned. An electrical arc discharge is generated at the junction between the fibers, thereby producing a sufficient amount of heat to melt the ends of the fibers and cause them to fuse. The arc is moved in a direction perpendicular to the axes of the fibers so that the central portion of the discharge traverses the fiber junction.

In accordance with this invention a splice between optical fibers can be made quickly and simply and results in a negligible loss at the junction. The splice possesses good strength without the need for sleeves or other mechanical supporting structure.

BREIF DESCRIPTION OF THE DRAWINGS

DETAILED DESCRIPTION

Figure 1:
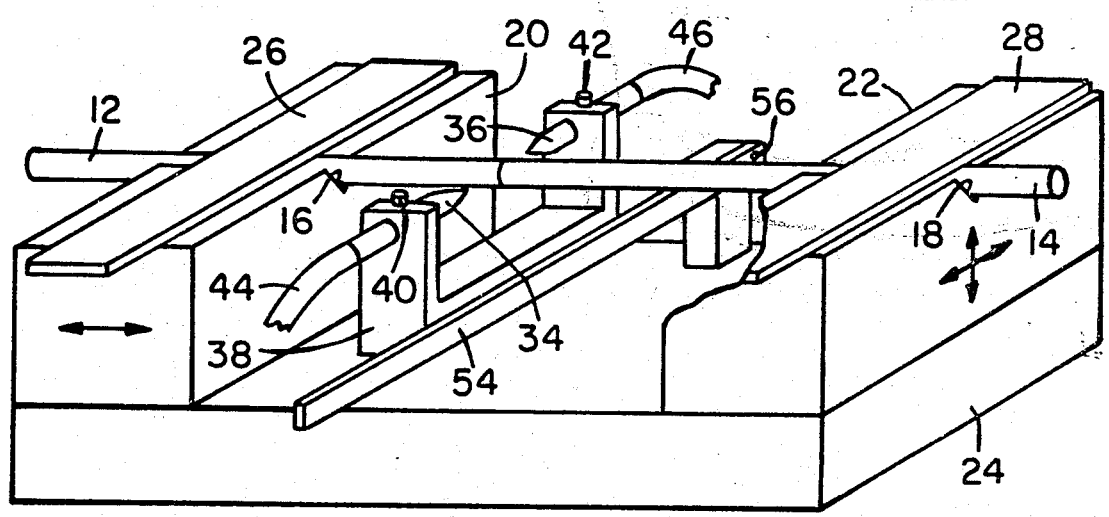
FIG. 1 is an oblique view of an apparatus for splicing optical fibers in accordance with the present invention.
Figure 2:
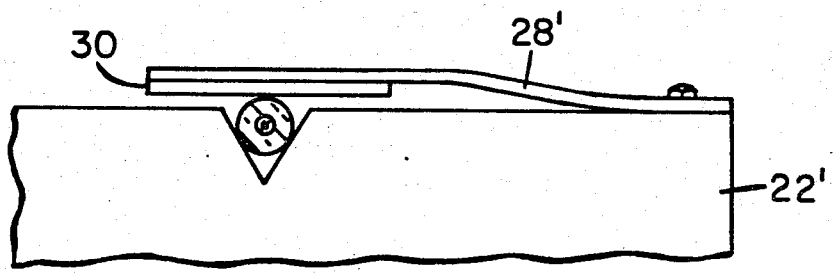
FIG. 2 is an end view of a modification of the embodiment of FIG. 1 illustrating fiber securing means.

Referring to the drawings, fibers 12 and 14 are disposed in V-shaped grooves 16 and 18, respectively which are formed in the surface of micropositioner stands 20 and 22, respectively. The length of the grooves must be sufficient to cause the fibers to extend therefrom in a direction parallel to the grooves. Due to the stiffness of the fibers and the small distance between members 20 and 22, the axes of the fiber end portions, which extend from the grooves, remain substantially linear. For example, in one embodiment members 20 and 22 were separated by only 2.5 cm. As indicated by the double-headed arrow, stand 20 is moveably mounted on base member 24 in such a manner that fiber 12 can be moved into contact with fiber 14. The crossed arrows on stand 22 indicate that it can be moved in two directions so that the axis of fiber 14 can be displaced in any direction with respect to the axis of fiber 12, the axes of these two fibers remaining parallel. The fibers are retained in their respective grooves by spring leaves 26 and 28 which apply a slight pressure to the fibers. As illustrated in FIG. 2, wherein elements similar to those of FIG. 1 are represented by primed reference numerals, that side of the spring leaves which contacts the fibers may be provided with a layer 30 of material such as plastic, cloth or the like so that the spring leaves do not scratch the fibers.

Figure 3:
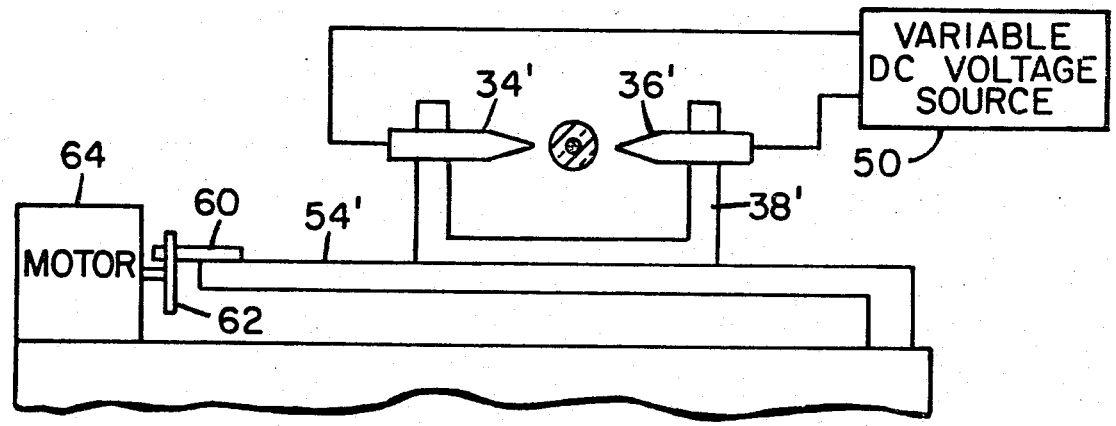
FIG. 3 illustrates another embodiment of the invention wherein means are provided for moving the arc along the fiber junction.

A pair of pointed electrodes 34 and 36 are disposed in a U-shaped support member 38 of insulating material. After the spacing between the electrode points is adjusted, the electrodes are retained in position by set screws 40 and 42. Conductive leads 44 and 46 connect electrodes 34 and 36 to a suitable voltage source. Although an AC voltage may be employed, a DC voltage is preferred since it provides a more stable arc. FIG. 3 schematically illustrates the connection of a variable DC source 50 to the electrodes. Support member 38 is mounted on a lever arm 54 which pivots about shaft 56. Movement of arm 54 in a vertical direction permits the height of the electrodes to be varied so that the central portion of the arc can be scanned across the fiber junction. Arm 54 may be formed from spring steel so that it bends slightly to permit the electrodes to be moved in a direction parallel to the fiber axes.

One of the most important criteria in making good lowloss splices is the quality of the fiber endfaces, a clean and relatively flat endface being essential to a good seal. The fiber endfaces may be prepared by scoring, stressing and bending as discussed by E. L. Chinnock et al. in their publication entitled "Optical Fiber End Preparation for Low-Loss Tape Splices," Bell System Technical Journal, Vol. 54, March 1975, pp. 471–477. Prior to splicing the fibers, any coating thereon must be removed. Conventional plastic coatings, which are applied to fibers to improve their strength, may be removed by dipping the end portions of the fibers in acetone. By separating the endfaces by a distance of about one fiber diameter and rapidly moving the arc through the space between the endfaces, impurities can be burned therefrom. The arc must be moved quickly enough that the endfaces do not become rounded.

The fiber endfaces are brought into contact in the vertical plane in which the points of the electrodes 34 and 36 are disposed. This can be done in any one of a variety of ways. For example, the fibers can be aligned by an operator using a microscope to observe and set the fibers. Alternatively, light from a source can be propagated in one of the fibers. Depending upon the alignment of the two fibers, some of the light is coupled to the other fiber across the gap between their endfaces. Proper alignment of the two fibers is determined by maximum light transmission between the fibers as indicated by a maximum reading on an indicator connected to a detector disposed adjacent to the output end of the other fiber.

Having properly aligned the fibers, the endfaces thereof are brought into contact and fused, i.e., their endfaces are melted and joined together in a splice having no interface. In accordance with a preferred embodiment the fibers are fused by a two step process whereby both a low energy arc and a high energy arc are employed. Following is a specific example of such a two step process which was employed to splice fibers having a total silica content between 60 and 80 wt.%. The minimum arc temperature, which is determined by electrode spacing and applied voltage, depends upon the characteristics of the glass from which the fiber is formed. A current of 10 mA with a 1.6 mm spacing between electrodes generates a discharge which is hot enough to soften such high silica content fibers. This initial low energy arc is applied for a period of about 5 to 10 seconds to the fiber ends as they are urged together to close any gap that may exist therebetween, a 5 second duration being sufficient for fibers having square endfaces, i.e., endfaces that are perpendicular to the fiber axes. The medium heat of this initially applied arc softens the fibers and makes a cold joint, i.e., the fiber endfaces stick together even when a force is applied which tends to pull them apart, but the optical characteristics of the cold joint are poor since the glass at the fiber endfaces has not become totally fused. The current is then increased to 15 mA while maintaining the same electrode spacing, thereby creating a hot arc capable of melting the glass at the fiber endfaces and causing them to fuse together.

During the time that both the cold joint and the final splice are being made, the arc is preferably moved back and forth across the entire fiber junction. Controlled movement of the arc provides a more gradual heating process and ensures that the entire junction is provided with a sufficient amount of heat for complete fusion to occur. It also reduces the occurrence of undesirable changes in fiber diameter at the fiber junction. This can be achieved by moving lever arm 54 in a circular manner so that the arc passes upward along one of the fibers and then downward along the other fibers.

If both fibers have good quality endfaces that are perpendicular to the fiber axes, the fibers can be spliced in a single step whereby a hot arc immediately melts the glass at the fiber endfaces. Although low loss splices have been formed by such a single step process, the two step process is preferred since it results in fewer poor splices due to trapped bubbles and since it is more effective in forming good splices even when the condition of the fiber endfaces is not optimal. The low energy arc of the two step process burns out impurities at the fiber junction without completely melting the endfaces so rapidly that the impurities become trapped and form bubbles which act as scattering centers. Moreover, any portion of one endface, which is not in contact with the other endface, can bead up due to the surface tension of the molten glass and pull away from the junction. If the low energy arc were employed for such a junction, the fiber endfaces could be urged together as the glass becomes softened. The application of the high energy arc to the junction would then cause the endfaces to flow together and completely fuse rather than bead up and form an imcomplete junction.

The above described apparatus has been employed to splice various types of clad glass fibers. One type of fiber was multimode, step-index fiber having a 85 μm core and an outside diameter of 125 μm. Losses varied between 0.0 dB and 2.5 dB with a measurement accuracy of 0.1 dB. Most splices in these fibers exhibited a loss of only about 0.2 dB.

Identical single mode fibers having a core diameter of 7.3 μm and an outer diameter of 250 μm were also spliced by this technique. An average loss of about 0.6 dB was obtained.

It should be understood that the above described embodiments are illustrative of a small number of the many possible specific embodiments which can represent applications of the principles of the present invention. Thus, numerous and varied other arrangements can readily be devised in accordance with these principles by those skilled in the art without departing from the spirit and scope of the invention. For example, the arc can be made to traverse a desired path along or around the fiber junction by mechanical means as well as the manually operated means illustrated in FIG. 1. As illustrated in FIG. 3, wherein elements similar to those of FIG. 1 are represented by primed reference numerals, a pin 60 affixed to lever arm 54' extends through a hole in disc 62 which is rotated by motor 64. The motion of the arc is preferably such that the center thereof moves in a circle having a diameter about equal to that of the fibers. Thus the fiber junction is never out of arc which appeared to have a diameter of about 10 mils at the vicinity of the fiber junction. Other means such as vibrating motor or a cam operated mechanism could be employed to provide reciprocating motion only.

I claim:

1. A method of splicing glass optical fibers comprising the steps of
    aligning the end portions of said fibers so that the axes thereof are substantially parallel and the endfaces thereof are in contact,
    generating at the junction between said fibers a low energy electric arc having sufficient energy to cause said fibers to adhere to each other but not completely fuse, therafter,
    generating a high energy electric arc having greater energy than said low energy arc, said high energy arc producing a sufficient amount of heat to melt the endfaces of said fibers, thereby causing said fibers to fuse, and
    moving said low and high energy arcs in a direction perpendicular to the axes of said fibers so that the central portion of said arcs moves along said fiber junction.

2. A method of splicing glass optical fibers comprising the steps of
    aligning the end portions of said fibers so that the axes thereof are substantially parallel and the endfaces thereof are in contact,
    disposing said fibers between the ends of a pair of spaced, rod-shaped electrodes,
    generating an electric arc between the ends of said electrodes, said arc passing through the junction of said fiber endfaces and producing a sufficient amount of heat to melt the endfaces of said fibers, thereby causing said fibers to fuse, and
    moving said electrodes in a direction perpendicular to the axes of said fibers so that the central portion of said arc moves along said fiber junction.

3. A method in accordance with claim 1 wherein the duration of said low energy arc is between 5 and 10 seconds.

4. A method in accordance with claim 3 wherein the ends of said fibers are urged together during the application of said low energy arc.

5. A method in accordance with claim 4 wherein said arc is also moved in an axial direction away from the ends of said fibers.

6. A method in accordance with claim 5 wherein prior to the time that said fibers have their endfaces in contacting alignment, said fibers are axially aligned with the endfaces thereof juxtaposed and separated, and rapidly moving an electric arc between said endfaces to burn impurities therefrom.

7. An apparatus for splicing glass optical fibers comprising
    first and second fiber retaining means for retaining the end portions of said fibers so that the axes thereof are substantially parallel and the endfaces thereof are in contact,
    a pair of electrodes,
    a voltage source connected to said electrodes for causing the generation of an electric arc between the ends thereof, said arc extending across the junction between said fibers and producing a sufficient amount of heat to melt the endfaces of said fibers, thereby causing said fibers to fuse, and
    means for causing relative movement between said electrodes and said fibers so that the central portion of said arc moves along said fiber junction.

8. An apparatus in accordance with claim 7 wherein said voltage source is variable.

9. An apparatus in accordance with claim 8 wherein said means for causing relative movement comprises means for moving said electrodes in the plane of said fiber junction.

10. An apparatus in accordance with claim 9 wherein said means for causing relative movement further comprises means for moving said electrodes in a direction parallel to the axes of saif fibers.

11. An apparatus in accordance with claim 7 wherein said means for causing relative movement comprises means for moving said electrodes in a direction parallel to the plane of said fiber junction and in a direction parallel to the axes of said fibers.

12. A method in accordance with claim 2 wherein said electrodes are also moved in such a manner that said arc moves in an axial direction away from the ends of said fibers.

* * * * *